Nov. 11, 1924.  
H. C. TOOMEY  
1,515,181  
SPREADING OR SOWING MACHINE FOR VEGETATIVE PLANTING  
Filed Oct. 22, 1923
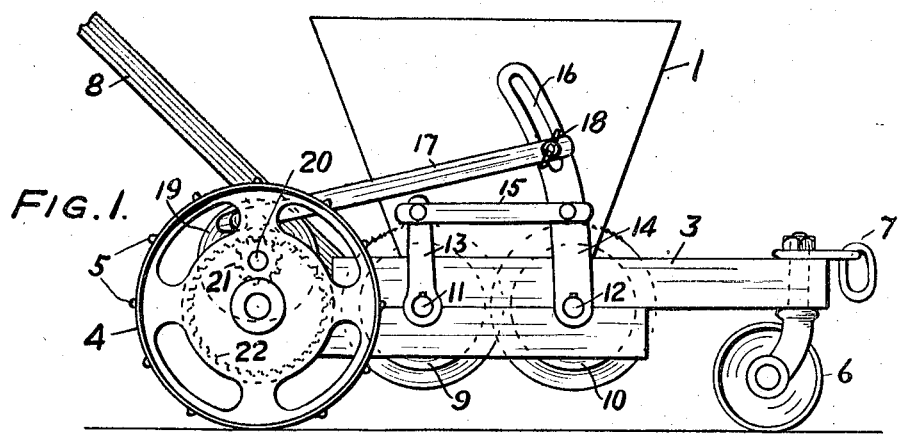
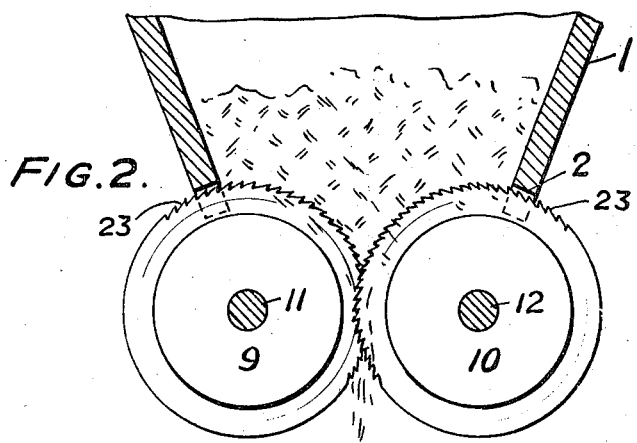
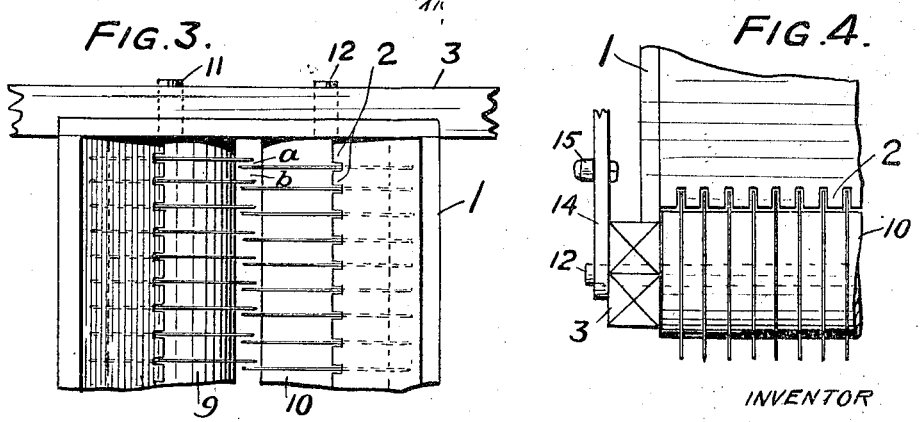
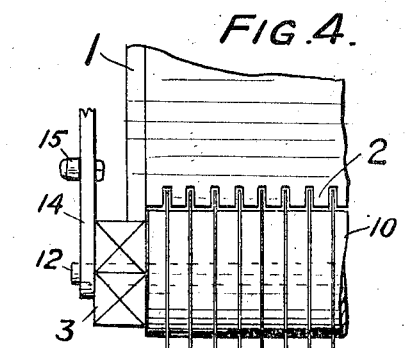
WITNESS:  
Rob R Kitchel
INVENTOR  
Howard C. Toomey  
BY  
Augustus B. Stoughton  
ATTORNEY.

Patented Nov. 11, 1924.

1,515,181

UNITED STATES PATENT OFFICE.

HOWARD C. TOOMEY, OF PHILADELPHIA, PENNSYLVANIA.

SPREADING OR SOWING MACHINE FOR VEGETATIVE PLANTING.

Application filed October 22, 1923. Serial No. 669,988.

*To all whom it may concern:*

Be it known that I, HOWARD C. TOOMEY, a citizen of the United States, residing at Philadelphia, in the county of Philadelphia and State of Pennsylvania, have invented a certain new and useful Spreading or Sowing Machine for Vegetative Planting, of which the following is a specification.

In the vegetative planting of bent grass, sods are torn and cut apart to provide stolons, joints or cut pieces which are planted by first spreading them on the surface of the ground and then covering them with top dressing.

Heretofore the spreading and sowing was done by hand and was therefore expensive and subject to personal error and variations.

The principal object of the present invention is to provide a machine for spreading or sowing the cut material upon the surface of the ground. Another object of the invention is to provide a machine for that purpose which will spread the cut pieces evenly and sufficiently close together. Another object of the invention is to provide a machine which in that work will function properly even if the wind is blowing. Another object of the invention is to provide a machine of the character mentioned which shall be simple in construction and reliable, efficient and inexpensive in operation.

Other objects of the invention will appear from the following description. The invention will be claimed at the end hereof. One embodiment of the invention selected from other embodiments of the invention is illustrated in the accompanying drawings forming part hereof and in which—

Figure 1 is a side view of a machine embodying features of the invention.

Fig. 2 is a sectional view drawn to an enlarged scale and illustrating a portion of the machine shown in Fig. 1.

Fig. 3 is a fragmentary top view, and

Fig. 4 is a fragmentary end view.

In the drawings, 1 is a bottomless hopper and it is shown as open at the top. The front and back walls of the hopper 1 are notched as at 2 and are inclined. The hopper 1 is mounted upon a wheeled frame or carriage. As shown the carriage consists of an open frame 3 having agricultural wheels 4, that is, wheels of comparatively wide tread fitted with cleats 5. The frame is also shown as mounted on a castor wheel 6 and as provided with a draft bar 7 and a steering handle 8. At the open bottom of the hopper 1 and at an opening through the frame 3 is arranged a pair of turnable rolls 9 and 10 spaced apart. As shown the shafts or spindles 11 and 12 of these rolls are turnable in bearings in the sides of the frame and their projecting ends have fixed to them crank arms 13 and 14. These crank arms 13 and 14 are a means for imparting turning motion to the rolls and as shown they are connected by a bar 15. The crank arm 14 is provided with a slot 16 in which is arranged the bearing for the pivotal connection of the link 17 in such a way that the point of pivotal connection of the link 17 and crank arm 14 can be adjusted towards and away from the spindle 12 by the set screw 18. The link 17 is connected with a disk 19 journaled at 20 and provided with a pinion 21 driven by an internal gear wheel 22 fast on the wheel 4. 23 are teeth projecting from said rolls 9 and 10. These teeth 23 are undercut away from the direction of feed from the hopper and as shown they are disposed in segments of the circumference of circles arranged in pairs with the space *a* between the teeth of each pair of width less than the space *b* between the respective pairs. As shown the teeth are provided on disks which alternate with washers and so make up the rolls. The teeth are "set" like saw teeth. The notches 2 in the walls of the hopper accommodate or provide space for the teeth. A portion only of the disks lies between the front and back walls of the hopper and the rest of the disks lies outside of those walls. The teeth of the disks of the respective rolls overlap.

In use the cut pieces, stolons or joints which may be in the condition that they were in when used for hand planting or sowing, are placed in the hopper 1. The machine is then moved over the ground to be planted. For this purpose it may be propelled in any way, for example, through the instrumentality of the draw bar 7 and guided by the handle 8. The result of this is that the spindles 11 and 12 are each turned first in one direction through a part of a circle, and then in the other direction through a part of a circle, and when one spindle is turning in one direction the other spindle is turning in the same direction. The sets of teeth appertaining to each spindle are therefore reciprocated or oscillated first in one direction and then in the other. Since the disks fits fairly well in the notches 2, the cut pieces, stolons or joints do not escape at the front and back of the hopper but are expelled from the bottom of the hopper by the described action of the teeth. The mass of cut pieces, stolons or joints in the hopper is supported in the hopper at the bight of the rolls and the reciprocation of the rows of teeth causes them to, as it were, nag the mass detaching individual stolons, joints or pieces and dropping them uniformly from the machine, so that as the latter travels, the pieces, joints or stolons are properly distributed upon the ground. Since the teeth are undercut in the direction of feed from the hopper, one set is feeding whilst the other set slips back into position for beginning to feed. The saw-like set of teeth and the described spacing of the rows of teeth together with their overlapping arrangement causes the stolons, joints or pieces to be properly detached from the mass and fed in the manner above indicated. By adjusting the thumb nut 18 and shifting the point of connection of the link 17 with the arm 14, it is possible to adjust the amplitude of reciprocation of the rows of teeth and in that way to increase or diminish the rate of feed.

It will be obvious to those skilled in the art to which the invention relates that modifications may be made in details of construction, arrangement and mere matters of form without departing from the spirit of the invention which is not limited as to those matters or otherwise than as the prior art and the appended claims may require.

I claim:

1. A spreading and sowing machine for vegetative planting comprising in combination a hopper having an opening at its bottom and adapted to contain masses of stolons or joints or cut pieces, opposed rows of teeth arranged at the opening in the bottom of the hopper in overlapping and spaced relation and adapted by their movement to detach stolons, joints or cut pieces from the mass and to feed the same uniformly from the machine, and means for moving the teeth.

2. A spreading and sowing machine for vegetative planting comprising in combination a hopper having an opening at its bottom and adapted to contain masses of stolons or joints or cut pieces, opposed rows of teeth arranged at the opening in the bottom of the hopper in overlapping and spaced relation and adapted by their movement to detach stolons, joints or cut pieces from the mass and to feed the same uniformly from the machine, and means for reciprocating the respective rows of teeth in opposite directions.

3. A spreading and sowing machine for vegetative planting comprising in combination a hopper having an opening at its bottom and adapted to contain masses of stolons or joints or cut pieces, opposed rows of undercut teeth arranged at the opening in the bottom of the hopper in overlapping and spaced relation and adapted by their movement to detach stolons, joints or cut pieces from the mass and to feed the same uniformly from the machine, and means for reciprocating the respective rows of teeth in opposite directions.

4. A spreading and sowing machine for vegetative planting comprising in combination a hopper having an opening at its bottom and adapted to contain masses of stolons or joints or cut pieces, opposed rows of undercut saw-set teeth arranged at the opening in the bottom of the hopper in overlapping and spaced relation and adapted by their movement to detach stolons, joints or cut pieces from the mass and to feed the same uniformly from the machine, and means for reciprocating the respective rows of teeth in opposite directions.

5. A spreading and sowing machine for vegetative planting comprising in combination a hopper having an opening at its bottom, opposed rows of teeth arranged at the opening in the bottom of the hopper and the teeth of one row being arranged with the teeth of the other row in pairs laterally spaced apart and the respective pairs being laterally spaced apart a greater distance than the distance between the teeth of each pair, and means for moving the teeth.

6. A spreading and sowing machine for vegetative planting comprising in combination a hopper having an opening at its bottom, opposed rows of overlapping teeth arranged at the opening in the bottom of the hopper and the teeth of one row being arranged with the teeth of the other row in pairs laterally spaced apart and the respective pairs being laterally spaced apart a greater distance than the distance between the teeth of each pair, and means for moving the teeth.

7. A spreading and sowing machine for vegetative planting comprising in combination a hopper having an opening at its bottom, opposed rows of overlapping saw-set undercut teeth arranged at the opening in the bottom of the hopper and the teeth of one row being arranged with the teeth of the other row in pairs laterally spaced apart and the respective pairs being laterally spaced apart a greater distance than the distance between the teeth of each pair, and means for moving the teeth.

8. A spreading and sowing machine for vegetative planting comprising in combination a bottomless hopper having notches at the bottom edges of its front and rear walls, confronting roll surfaces spaced apart and arranged at the opening in the hopper and near the said edges of said walls, teeth projecting from said surfaces and accomodated by said notches, and means for moving said roll surfaces and teeth.

9. A spreading and sowing machine for vegetative planting comprising in combination a hopper, a pair of turnable spaced roll surfaces of which the bight constitutes the bottom of the hopper, spaced rows of teeth provided on said roll surfaces, and means for reciprocating said roll surfaces.

10. A spreading and sowing machine for vegetative planting comprising in combination an open frame, a pair of spaced rolls turnably mounted in the frame and provided with rows of overlapping saw teeth, mechanism for moving the rolls, and a hopper mounted on the frame and having in its bottom an opening disposed at the bight of the rolls and having notched walls for the accommodation of the teeth.

HOWARD C. TOOMEY.